Aug. 24, 1926.
J. M. MEYERS
1,597,533
DATA RECORDING SYSTEM AND TICKET
Filed August 6, 1924
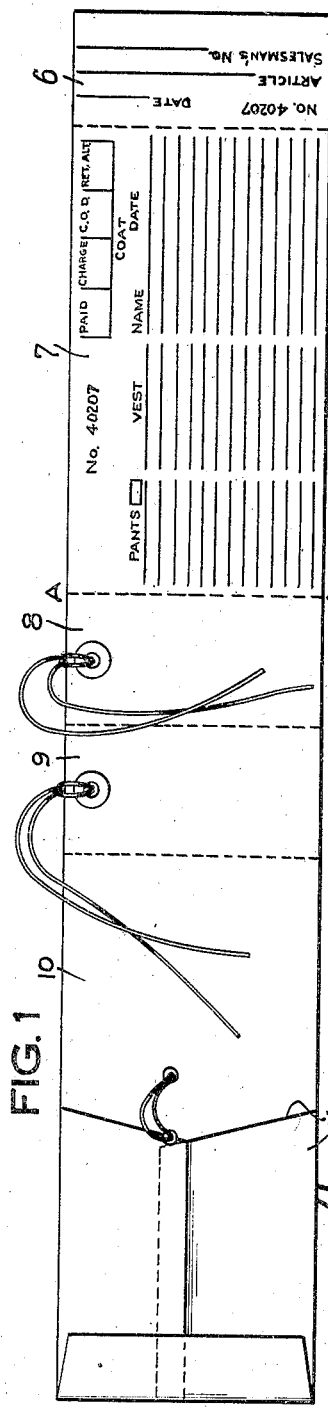
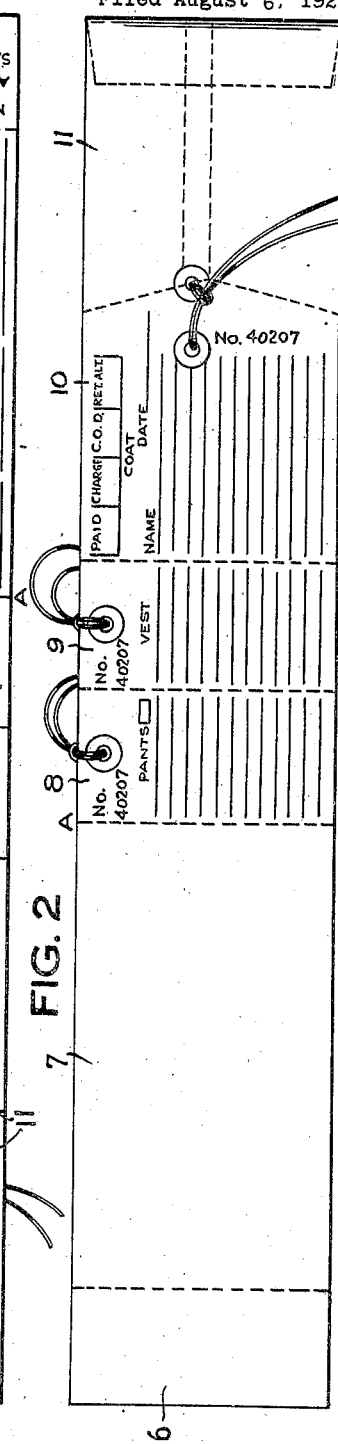
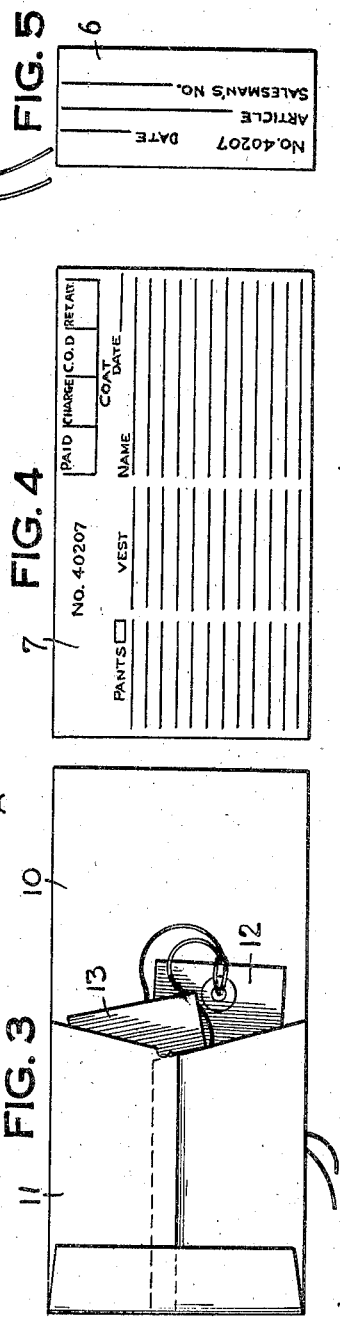
INVENTOR
Joseph M. Meyers
By Kay, Totten & Martin,
Attorneys Patented Aug. 24, 1926.

1,597,533

UNITED STATES PATENT OFFICE.

JOSEPH M. MEYERS, OF PITTSBURGH, PENNSYLVANIA.

DATA-RECORDING SYSTEM AND TICKET.

Application filed August 6, 1924. Serial No. 730,436.

My invention relates to data recording systems and tickets, and particularly, to an improved means for systematizing, recording and checking the movements of and operations upon a number of related articles.

For convenience of description I will show my invention as employed in connection with the sale of men's suits upon the various parts of which alterations may be required. It will, of course, be understood that the invention is applicable to other uses than in connection with the sale of clothes; for instance, as in a factory, where several parts which go to make up a unit require different operations thereon.

The invention has for its object a simplified recording system and ticket whereby the recording of data with respect to and the routing of, various related articles are conveniently and accurately effected, and also the provision of a unitary structure embodying data-recording sections and a pocket for the reception of related data.

One manner in which my invention may be practiced is shown in the accompanying drawing wherein Fig. 1 is a view of one side of the ticket which I employ; Fig. 2 shows the reverse side thereof, with the ends of the ticket reversed; Figs. 3, 4 and 5 are detached sections of the ticket shown in Figs. 1 and 2.

The ticket comprises a voucher or memorandum 6 that is detached and handed to the customer at the time of purchase; a master record 7; a pants alteration tag 8; a vest alteration tag 9, and a coat alteration tag 10. The tag 10 may have a pocket 11 formed integrally therewith for the reception of a shipping tag 12, and a customer's bill or shipping instructions 13.

At the time of making the sale, the ticket having first been folded on the line A—A so that the printed matter of Fig. 1 will lie over the printed matter that appears in Fig. 2, with carbon paper interposed therebetween, the various information such as name and address of the customer is written down, after which notations as to alterations required in the pants, vest and coat, are entered in the respective columns, such information being duplicated on the tags 8, 9 and 10 by reason of the carbon paper referred to. Each portion of the ticket contains the number of the order, which may be written or printed thereon.

Upon completion of notations as to changes, etc. the garment and tickets are handed to a clerk who attaches the tags 8, 9 and 10 and affixes them to their respective garments, while bill 13 may be sent to the credit department for approval. Upon return of the bill 13, the master record 7, together with the garments contained in the tags 8, 9 and 10 are sent to the workroom where the receiving clerk places the master record 7 on a temporary file and distributes the garments containing the tags 8, 9 and 10 to the workers for alteration. A button hole slit may be provided in the pocket portion of the ticket, instead of the string shown, as means of attachment to a garment button.

When the garments have been altered they are returned to the receiving clerk who assembles the garments containing identical numbers at an assembling table where they are wrapped for shipment and the shipping tag 12 attached. The master record 7 enables the clerk in charge thereof to have a record of the suits on which alterations are being made and is placed in a permanent file after wrapping and shipment of the order.

The numbered separate tags enables each worker to operate on his garment without regard to who may be operating on the other garments, or its location in the shop. The rear sides of the alteration tags 8, 9 and 10 are shown as blanks and may be utilized to note the amount of time spent on that particular job, or for the notation of information whereby the worker may be apportioned a bonus. Various changes in detail and general arrangement may be made without departing from the spirit and scope of the invention as defined in the accompanying claims.

What I claim is:

1. A recording ticket comprising a portion divisible into sections each of which is appropriately designated for adapting it to contain directions for work on one article of a related group, and a corresponding master record containing appropriately designated spaces for recording all of the entries on said sections and a character identifying it with each of said records.

2. A recording ticket comprising original and duplicate records, each of which is divided into sections, the sections of one of said records being separable for attachment individually to designate articles of a related group and each containing appropriately designated spaces for the entry of directions concerning the article to which it is to be attached.

3. A recording ticket comprising a portion divisible into sections each of which is appropriately designated for adapting it to contain directions with respect to a designated article of a related group, and a pocket portion on one of said sections for the reception of sheets of instructions common to all sections.

4. A recording ticket comprising a portion divisible into sections. each of which is appropriately designated for adapting it to contain directions with respect to a designated article of a related group, a separable section containing a master record of the said directions, and a pocket portion on one of said sections for the reception of sheets of instructions common to all of the sections.

5. A recording ticket comprising a portion divisible into sections each of which is appropriately designated for the reception of directions for work on one article of a related group, a master record which may be brought into registry with the said sections simultaneously and containing appropriately designated spaces for the reception of the directions placed upon said sections.

In testimony whereof I, the said Joseph M. Meyers, have hereunto set my hand.

JOSEPH M. MEYERS.